T. DEWEES.
Windmill.

No. 222,256. Patented Dec. 2, 1879.

WITNESSES:
Henry N. Miller
C. Sedgwick

INVENTOR:
T. Dewees
BY Munn & Co.
ATTORNEYS.

UNITED STATES PATENT OFFICE.

THOMAS DEWEES, OF SAN ANTONIO, TEXAS.

IMPROVEMENT IN WINDMILLS.

Specification forming part of Letters Patent No. 222,256, dated December 2, 1879; application filed June 3, 1879.

*To all whom it may concern:*

Be it known that I, THOMAS DEWEES, of San Antonio, in the county of Bexar and State of Texas, have invented a new and Improved Windmill, of which the following is a specification.

The invention consists in arranging three stationary sails between arms on central shaft, so as to obtain double or increased power from the air passing through the wheel.

Figure 1:
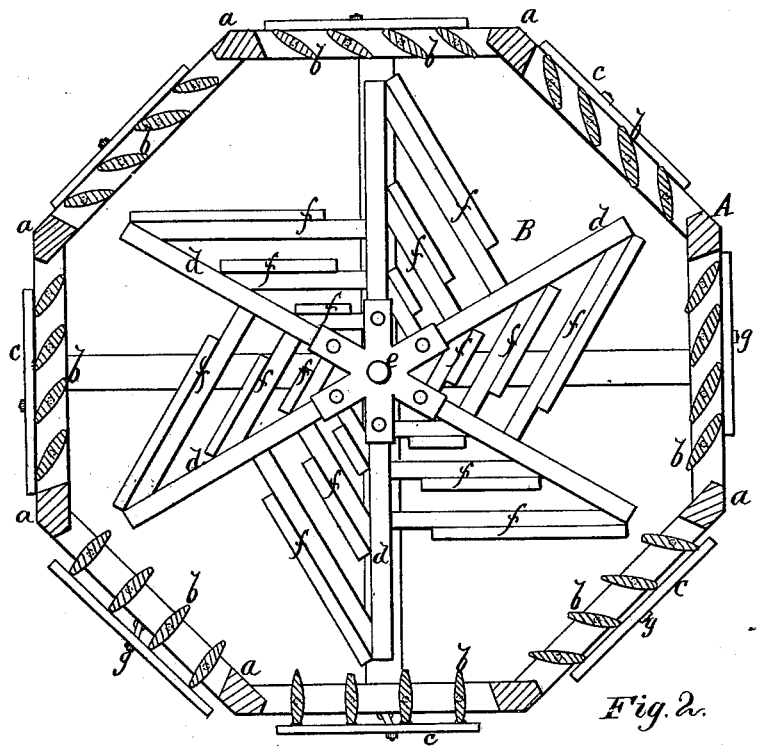
Figure 2:
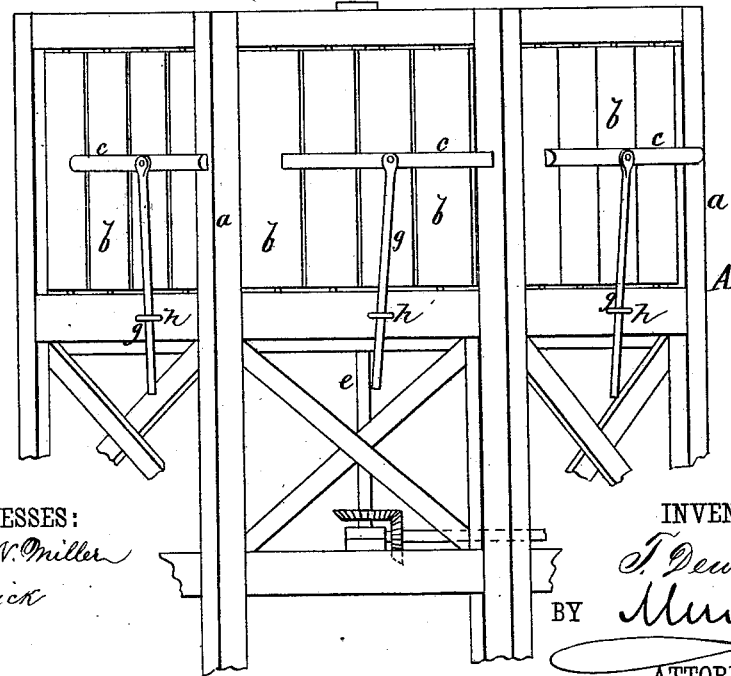

The invention will be described in connection with the accompanying drawings, wherein Figure 1 is a horizontal section through the upper section of the tower. Fig. 2 is a side elevation.

Similar letters of reference indicate corresponding parts.

The tower A is to be made of substantial frame-work, and braced so as to sustain within the upper section the wheel B. The upper section is eight-sided. The angles of the sides are formed by the vertical posts $a$ of the tower, between which are fitted shutters $b$ in a vertical position, there being, by preference, four shutters to each side, and connected by a cross-bar, $c$. These shutters $b$ are to be hung loosely, so that they will be opened by the wind, and when closed the wheel will be entirely shielded from the wind.

The wheel B consists of upper and lower radial arms, $d$, extending from hubs attached on the vertical shaft $e$, and carrying between them the paddles $f$, that are set at a suitable angle for receiving the wind. There are three paddles, $f$, connected with each arm $d$, the outer one inclining inward from the end of the arm at an acute angle, and the others placed behind and parallel, whereby the wind is utilized to the greatest extent.

In operation, the wind coming from any direction will open the shutters on one or more sides, and also at the opposite sides after passing through the tower and propelling the wheel. The action is the same, whatever the direction of the wind may be, and the speed will be regulated by the extent to which the shutters open.

There is a lever, $g$, connected to each cross-bar $c$, fulcrumed at $h$, and with its lower end extending down to a convenient place for being operated by hand. This lever is to be used for partially or entirely closing the shutters either to regulate the speed of the wheel or stop it by shutting off the wind entirely.

The advantages of the above-described construction are as follows: Wind from any direction can be utilized and to its fullest extent. The wheel and tower are simple, durable, and inexpensive in construction. The mill is adapted for all purposes, and may be made in a fixed or portable form. The whole structure may be of wood or iron, or those materials combined, as desired.

It will be observed that the three sets of stationary sails or paddles are held in a vertical position between each pair of arms from the center shaft, and are so arranged that when the wind strikes the first paddle on the outer row it is guided and deflected to the second paddle on the second row, and from these to the third or inner set; hence there is no chance for the wind to escape, retard, or counteract the motion first given, and a maximum pressure is obtained. After passing the paddle on the last section the wind exerts its power on the first section and the air in passing through the entire wheel is exerting a motive power in one direction, producing a rotary motion of the wheel without a retarding influence by striking an opposite angle.

I am aware that the lever, springs, and hinged doors are not new; but

What I claim is—

The combination, in a windmill, of a tower having the loose shutters $b$ in a vertical position, and a wheel, B, consisting of a shaft having radial arms and three intermediate paddles connected with each arm, as shown and described.

THOMAS DEWEES.

Witnesses:
 H. B. ADAMS,
 THEO. ELCHLEPP.